United States Patent
Chen et al.

(10) Patent No.: US 9,337,517 B2
(45) Date of Patent: May 10, 2016

(54) SOLAR POWERED CART

(71) Applicants: Kung-Cheng Chen, Taichung (TW); Lung-Chuan Huang, Taichung (TW)

(72) Inventors: Kung-Cheng Chen, Taichung (TW); Lung-Chuan Huang, Taichung (TW)

(73) Assignee: E-MAKE CO., LTD., Taichung (TW)

( * ) Notice: Subject to any disclaimer, the term of this patent is extended or adjusted under 35 U.S.C. 154(b) by 327 days.

(21) Appl. No.: 14/097,981

(22) Filed: Dec. 5, 2013

(65) Prior Publication Data

US 2015/0162647 A1    Jun. 11, 2015

(51) Int. Cl.
| | |
|---|---|
| *H01M 10/46* | (2006.01) |
| *H02J 7/00* | (2006.01) |
| *H02J 7/35* | (2006.01) |
| *H02S 30/20* | (2014.01) |
| *F04B 35/06* | (2006.01) |
| *H01M 2/10* | (2006.01) |
| *H02J 1/00* | (2006.01) |

(52) U.S. Cl.
CPC ............ *H01M 10/465* (2013.01); *H02J 7/355* (2013.01); *H02S 30/20* (2014.12); *F04B 35/06* (2013.01); *H01M 2/1022* (2013.01); *H02J 7/0013* (2013.01); *H02J 7/0029* (2013.01); *H02J 7/0055* (2013.01); *H02J 2001/006* (2013.01); *Y02B 10/14* (2013.01)

(58) Field of Classification Search
CPC ....... H02J 7/355; H02J 7/0013; H02J 7/0029; H02J 7/0055; H01M 10/465; F04B 35/06; H02S 30/20; Y02B 10/14
USPC .................. 417/234, 411; 312/313, 316, 281, 312/249.8, 249.11–249.13
See application file for complete search history.

(56) References Cited

U.S. PATENT DOCUMENTS

| | | | | |
|---|---|---|---|---|
| 4,232,357 A | * | 11/1980 | Dietz ..................... | F21L 14/04 362/191 |
| 4,458,941 A | * | 7/1984 | Venable ................... | E02F 9/16 297/118 |
| 6,201,181 B1 | * | 3/2001 | Azzam .................... | H02S 40/38 126/600 |
| 6,578,938 B2 | * | 6/2003 | Norman ................. | A47B 43/00 206/373 |
| 6,773,237 B2 | * | 8/2004 | Burford .................. | F04B 35/06 307/116 |
| 7,111,852 B2 | * | 9/2006 | Woods ..................... | B62B 3/00 280/47.34 |
| 7,795,837 B1 | * | 9/2010 | Haun .................. | H01M 10/441 136/244 |
| 2002/0180404 A1 | * | 12/2002 | Benn ........................ | F24J 2/36 320/101 |
| 2003/0039557 A1 | * | 2/2003 | Burford .................. | F04B 35/06 417/234 |
| 2007/0013340 A1 | * | 1/2007 | Mattichak ............. | H02J 7/0029 320/101 |
| 2009/0039705 A1 | * | 2/2009 | Lyman ................ | H01M 2/1022 307/64 |
| 2009/0230783 A1 | * | 9/2009 | Weed ...................... | H02J 7/355 307/150 |
| 2010/0026151 A1 | * | 2/2010 | Melkumyan ............. | B25H 1/02 312/249.11 |
| 2012/0291847 A1 | * | 11/2012 | Rowe, Jr. ................ | H02S 20/00 136/245 |

* cited by examiner

*Primary Examiner* — Peter J Bertheaud
*Assistant Examiner* — Dominick L Plakkoottam

(57) ABSTRACT

A solar powered cart is provided with a cabinet including a plurality of drawers, a plurality of doors, and a plurality of wheels mounted under the cabinet; a pivotal solar photovoltaic panel disposed on the cabinet and being capable of converting energy of light directly into electricity; a plurality of rechargeable batteries disposed in the drawers and capable of storing the electricity supplied from the solar photovoltaic panel; a controller electrically connected to the rechargeable batteries and capable of regulating charging and discharging of the rechargeable batteries and protecting overload; a transformer electrically connected to the controller for outputting DC voltage or AC voltage; and an air compressor disposed in the cabinet and electrically connected to the transformer, the air compressor being configured to output pressurized air.

1 Claim, 4 Drawing Sheets

SOLAR POWERED CART

BACKGROUND OF THE INVENTION

1. Field of the Invention

The invention relates to solar powered vehicles and more particularly to a solar powered cart.

2. Description of Related Art

The use of solar energy as a source of motive power would be a desirable solution. Thus, solar powered vehicles have been in use since last century. However, applications of such vehicles are limited due to, in part, heavy storage batteries.

A conventional solar powered baggage cart includes a baggage container portion, an operator platform, front wheels and rear wheels underlying the baggage cart for supporting, and an array of photo-voltaic cells located in an overlying relationship to the container. The cells are in electrical communication with a bank of batteries through a charging control circuit for charging the batteries, which are mounted under the baggage cart and are electrically connected to one or more electric motor/pumps. The electric motor/pumps are in mechanical communication with respective drive motors and brakes for the front and rear wheels.

While the above solar powered baggage cart has some utility, improvements in these products are desired, and these improvements are provided by the invention.

SUMMARY OF THE INVENTION

It is therefore one object of the invention to provide a solar powered cart comprising a cabinet including a plurality of drawers, a plurality of doors, and a plurality of wheels mounted under the cabinet; a pivotal solar photovoltaic panel disposed on the cabinet and being capable of converting energy of light directly into electricity; a plurality of rechargeable batteries disposed in the drawers and capable of storing the electricity supplied from the solar photovoltaic panel; a controller electrically connected to the rechargeable batteries and capable of regulating charging and discharging of the rechargeable batteries and protecting overload; a transformer electrically connected to the controller for outputting DC (direct current) voltage or AC (alternating current) voltage; and an air compressor disposed in the cabinet and electrically connected to the transformer, the air compressor being configured to output pressurized air.

The above and other objects, features and advantages of the invention will become apparent from the following detailed description taken with the accompanying drawings.

DETAILED DESCRIPTION OF THE INVENTION

Figure 1:
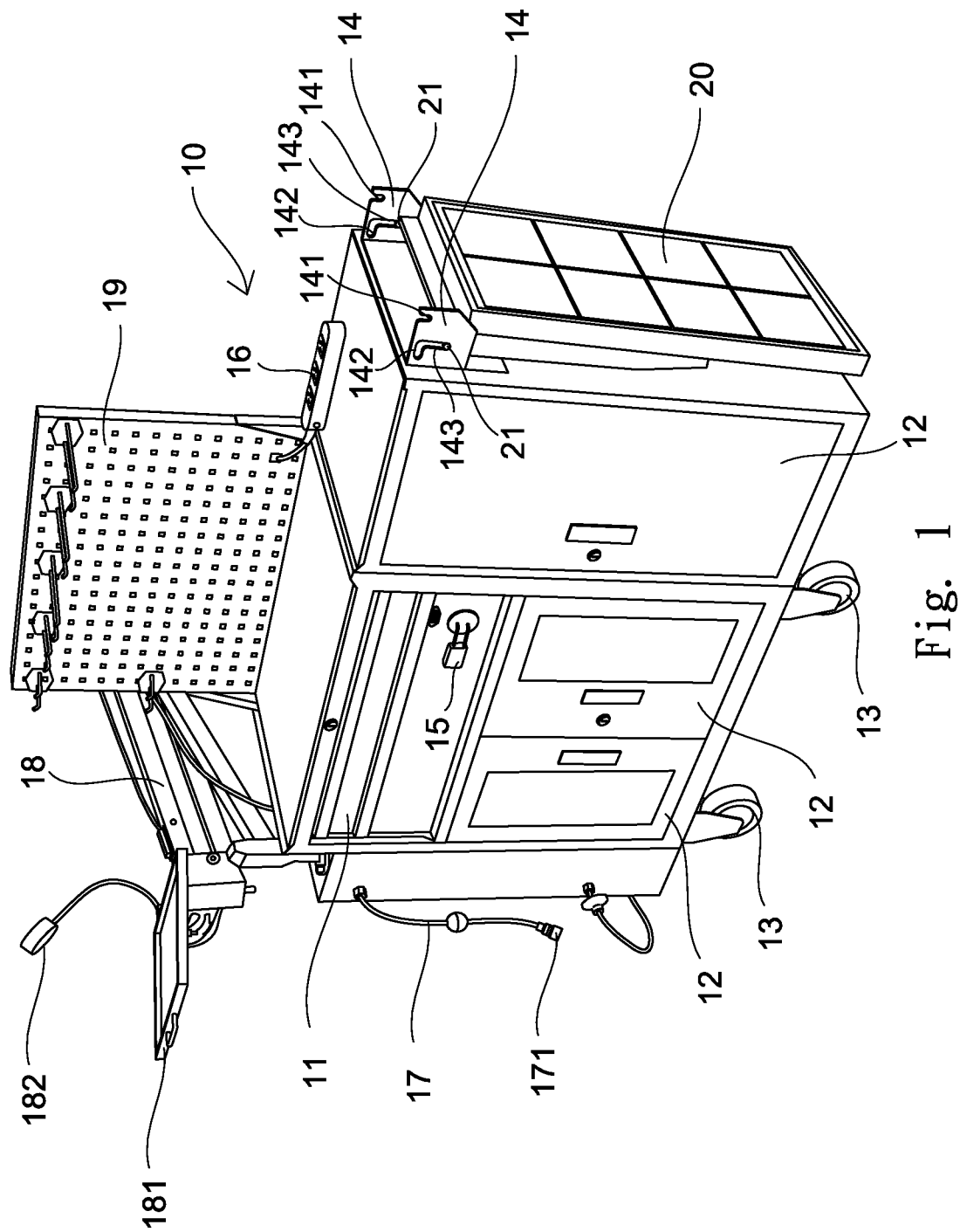
FIG. 1 is a perspective view of a solar powered cart according to the invention.

Referring to FIGS. 1 to 4, a solar powered cart in accordance with the invention comprises the following components as discussed in detail below.

A cabinet 10, a solar photovoltaic panel 20, a controller 30, a power inverter 31, a plurality of rechargeable batteries 32, and an air compressor 40 are provided.

A plurality of drawers 11 are provided in the cabinet 10. A plurality of doors 12 are provided. A plurality of wheels 13 are mounted under the cabinet 10 for wheeling the cart. Two brackets 14 are provided on two corners of the rear end adjacent to a top and each bracket 14 comprises a horizontal slot 142 and a vertical slot 143 communicating with and being perpendicular to the horizontal slot 142. A cavity 141 is provided on a top edge of the bracket 14 and is farther away from the rear end of the cabinet 10 than the slots 142, 143.

An arm 18 is provided on a front end and comprises a platform 181 at an open end and a lamp 182 extending upward from the platform 181, the lamp 182 being electrically connected to the power inverter 31. The arm 18 has a number of sections so that height and position of the platform 181 can be adjusted. An extension cord 17 is provided on a front end and has a plug 171 on an open end. The plug 171 can be attached to a lamp 50 and the extension cord 17 can be electrically connected to the power inverter 31. The extension cord 17 can be stored in the cabinet 10 when not in use. A tool board 19 is provided on a right edge of a top for allowing a plurality of tools to be hung thereon.

Figure 2:
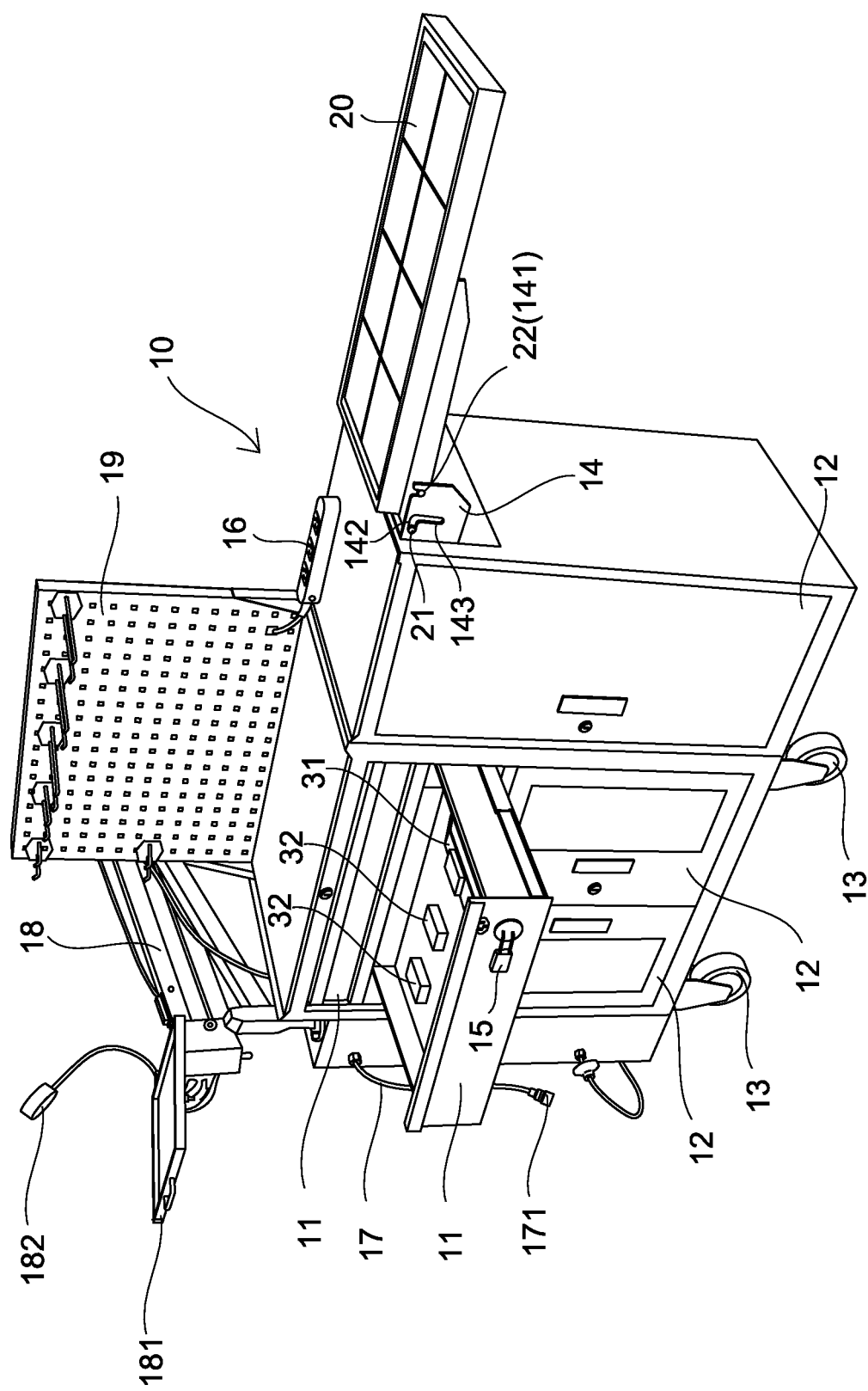
FIG. 2 is a view similar to FIG. 1 with the drawer being drawn out and the solar photovoltaic panel being pivoted to a horizontal position.
Figure 3:
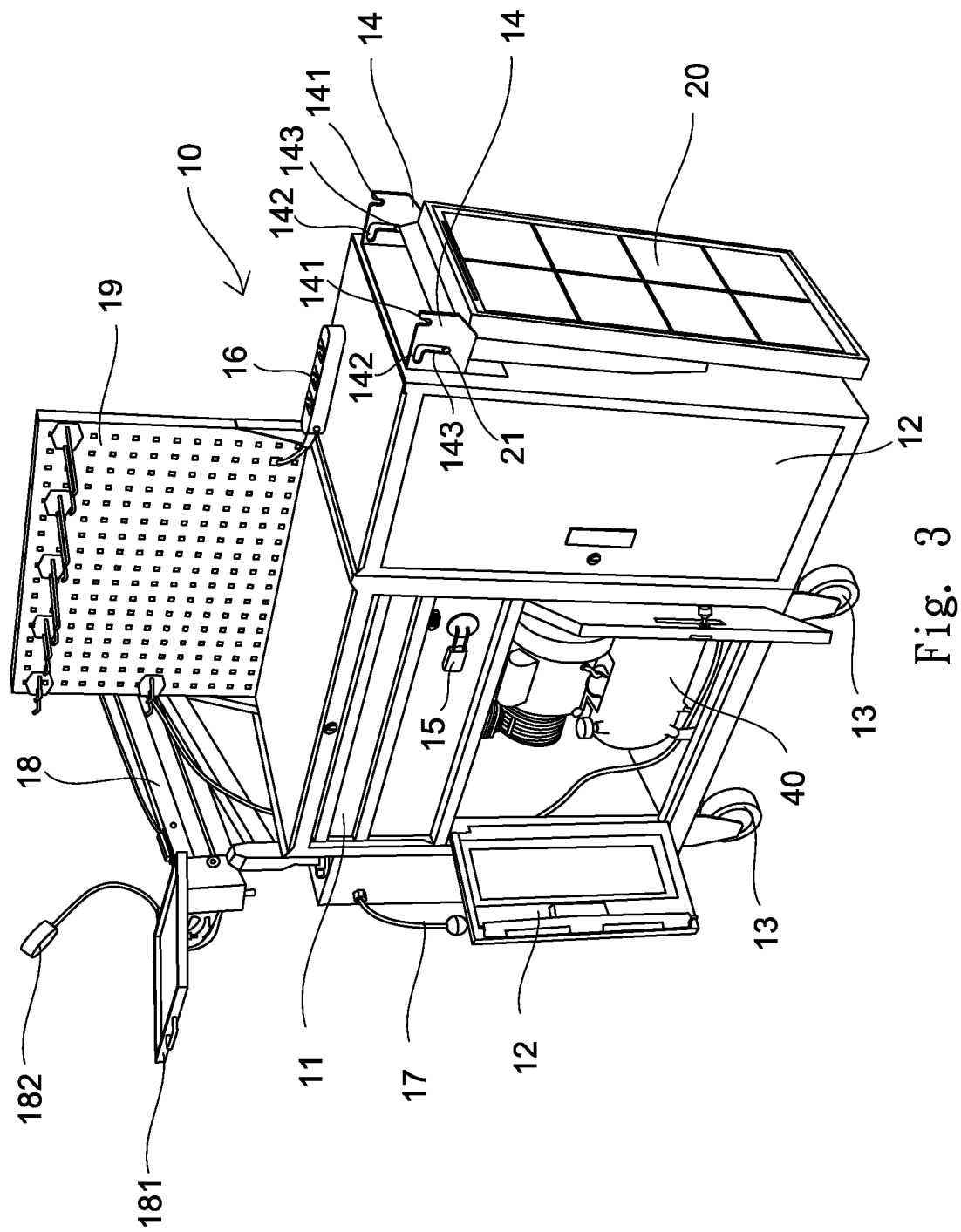
FIG. 3 is a view similar to FIG. 1 with the air compressor being seen after opening the doors.
Figure 4:
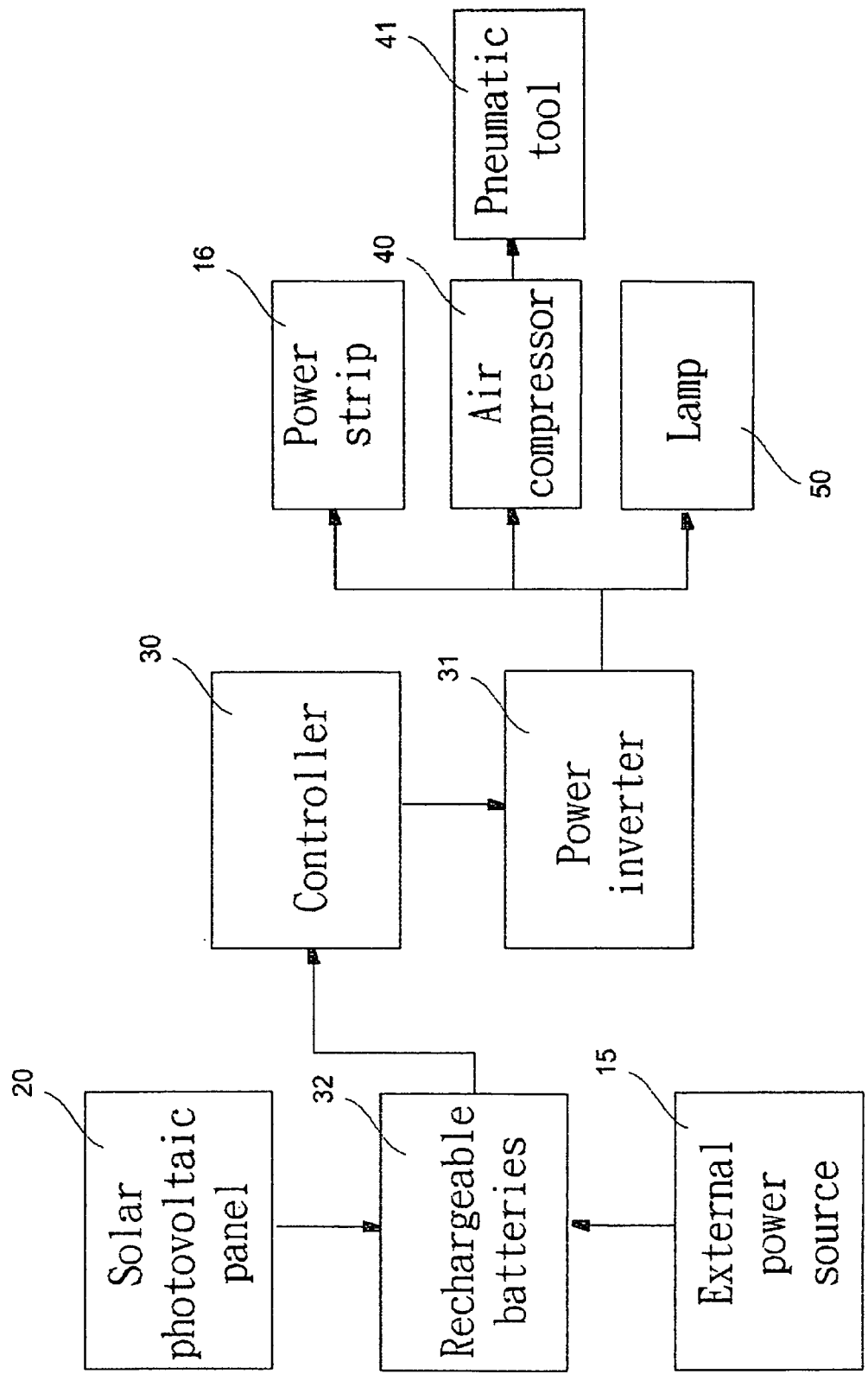
FIG. 4 is a block diagram of the solar powered cart of the invention.

The solar photovoltaic panel 20 has a glass cover (not shown) and includes a plurality of solar cells being packaged and connected together. The solar cell is made from monocrystalline silicon wafer and is an electrical device that converts the energy of light directly into electricity (e.g., DC 24V) by the photovoltaic effect. The electricity is supplied to the rechargeable batteries 32 for storage. The solar photovoltaic panel 20 is rectangular and comprises two first pins 21 slidably disposed in the slots 142, 143, and two second pins 22. As shown in FIG. 2, in an operative position with the solar photovoltaic panel 20 being upward pivoted to a horizontal position, the first pins 21 are disposed at ends of the horizontal slots 142 proximate the rear red of the cabinet 10, and the second pins 22 have fallen into the cavities 141 for allowing the solar photovoltaic panel 20 to absorb a maximum sunlight. Alternatively, as shown in FIG. 3, in an inoperative position with the solar photovoltaic panel 20 being downward pivoted to a vertical position, the first pins 21 are disposed at ends of the vertical slots 143 distal the rear end of the cabinet for storing the solar photovoltaic panel 20 in a compact form.

The rechargeable batteries 32 are provided in the drawers 11 and can store electricity from the solar photovoltaic panel 20 or an external power source 15. The controller 30 is electrically interconnected to the rechargeable batteries 32 and the power inverter 31 which in turn supplies power to each of the power strip 16, the air compressor 40 and the lamp 50. Further, the pneumatic tool 41 is operatively connected to the air compressor 40. The controller 30 has the functions of regulating charging and discharging of the rechargeable batteries 32, and overload protection. The power inverter 31, for example, can convert DC 24V from the rechargeable batteries 32 into AC 110V (or AC 220V in another configuration). The air compressor 40 is provided in the cabinet 10 and is adapted to output pressurized air.

While the invention has been described in terms of preferred embodiments, those skilled in the art will recognize that the invention can be practiced with modifications within the spirit and scope of the appended claims.

What is claimed is:

1. A solar powered cart comprising:
    a cabinet including a plurality of drawers, a plurality of doors, and a plurality of wheels mounted under the cabinet;

a pivotal solar photovoltaic panel disposed on the cabinet and being capable of converting energy of light directly into electricity;

a plurality of rechargeable batteries disposed in the drawers and capable of storing the electricity supplied from the solar photovoltaic panel;

a controller electrically connected to the rechargeable batteries and capable of regulating charging and discharging of the rechargeable batteries and protecting overload;

a power inverter electrically connected to the controller for outputting DC (direct current) voltage or AC (alternating current) voltage;

an air compressor disposed in the cabinet and electrically connected to the power inverter, the air compressor being configured to output pressurized air; and two brackets disposed on two corners of a rear end of the cabinet adjacent to a top of the cabinet, each of the brackets including a horizontal slot, a vertical slot communicating with and being perpendicular to the horizontal slot, and a top cavity farther away from the rear end of the cabinet than the horizontal and vertical slots;

wherein the pivotal solar photovoltaic panel comprises two first pins slidably disposed in the horizontal and vertical slots, and two second pins;

wherein in an inoperative position the first pins are disposed at bottom ends of the vertical slots and the pivotal solar photovoltaic panel is disposed vertically; and wherein in an operative position the first pins are disposed at ends of the horizontal slots proximate to the rear end of the cabinet, the second pins have fallen into the cavities, and the pivotal solar photovoltaic panel is disposed horizontally.

* * * * *